United States Patent [19]

Smith

[11] Patent Number: 5,232,021
[45] Date of Patent: Aug. 3, 1993

[54] PROBE MEMBER FOR UNDERSEA HYDRAULIC COUPLING

[75] Inventor: Robert E. Smith, Missouri City, Tex.

[73] Assignee: National Coupling Co., Inc., Stafford, Tex.

[21] Appl. No.: 968,371

[22] Filed: Oct. 29, 1992

[51] Int. Cl.⁵ .............................................. F16L 37/28
[52] U.S. Cl. ......................... 137/614.04; 251/149.7; 285/108; 285/111; 285/917
[58] Field of Search .................... 137/614.04, 614; 251/149.6, 149.7; 285/108, 111, 917

[56] References Cited

U.S. PATENT DOCUMENTS

| | | | |
|---|---|---|---|
| 1,913,982 | 11/1933 | Fox | 285/111 |
| 3,147,015 | 1/1964 | Hanback | 277/205 |
| 3,163,431 | 10/1964 | Tanner | 277/206 |
| 3,288,472 | 4/1966 | Watkins | 277/11 |
| 3,378,269 | 7/1968 | Castor | 277/205 |
| 4,637,470 | 7/1987 | Weathers et al. | 166/344 |
| 4,694,859 | 3/1987 | Smith | 137/614.04 |
| 4,709,726 | 1/1987 | Fitzgibbons | 137/614.04 |
| 4,754,780 | 9/1988 | Smith | 137/614.04 |
| 4,768,538 | 3/1988 | Mintz et al. | 137/15 |
| 4,813,454 | 2/1989 | Smith | 137/614.04 |
| 4,817,668 | 5/1989 | Smith | 137/614.04 |
| 4,832,080 | 5/1989 | Smith | 137/614.04 |
| 4,834,139 | 2/1989 | Fitzgibbons | 137/614.04 |
| 4,854,615 | 1/1989 | Smith | 285/331 |
| 4,858,648 | 12/1989 | Smith et al. | 137/614.04 |
| 4,884,584 | 1/1989 | Smith | 137/614.04 |
| 4,900,071 | 4/1990 | Smith | 285/379 |
| 5,015,016 | 11/1991 | Smith | 285/108 |
| 5,029,613 | 12/1991 | Smith | 137/614.04 |
| 5,052,439 | 7/1991 | Smith | 137/614.04 |
| 5,099,882 | 3/1992 | Smith | 136/614.04 |

Primary Examiner—A. Michael Chambers
Attorney, Agent, or Firm—Arnold, White & Durkee

[57] ABSTRACT

A probe member for an undersea hydraulic coupling is disclosed having at least one circumferential depression in its outer cylindrical body, for disengaging one or more radial seals during insertion or withdrawal of the probe member from the receiving member of a coupling. The disengagement of the radial seals allows seawater to bleed from or into the space between the coupling members and thereby balance the coupling and seals to seawater pressure.

17 Claims, 2 Drawing Sheets

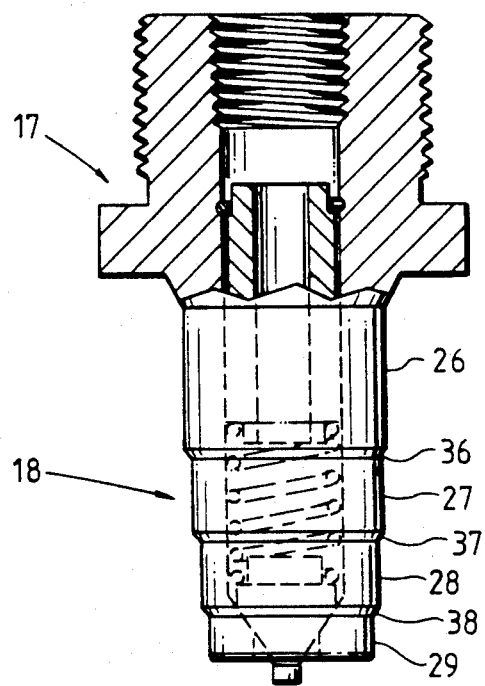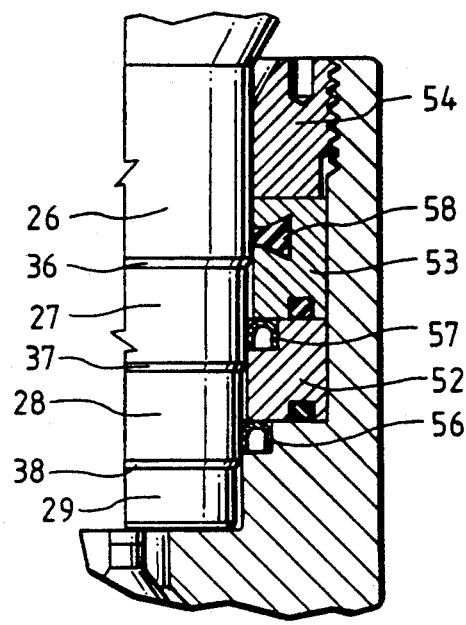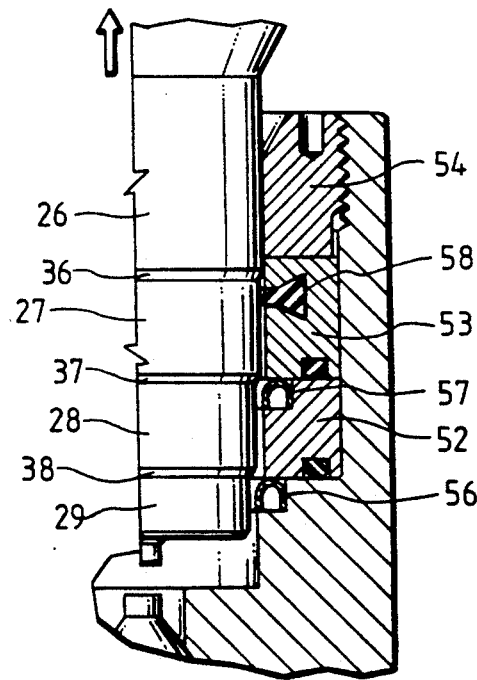

PROBE MEMBER FOR UNDERSEA HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves a probe member for an undersea hydraulic coupling configured to balance the space between the male and female members to sea pressure.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use hydraulic couplings in relatively high pressure systems due to the high axial forces imposed on the male and female members during their coupling operation and during their use. In such couplings, it is necessary for the fluid force opposing the face of the male or female member to be overcome before the fluid communication is established between the members. In a relatively high pressure system, a partial vacuum in the sealed space between the members when disconnecting the coupling members may cause the seal to be sucked out of its position between the members. Also, the seals between the members may result in a hydraulic lock when the coupling members are connected and/or disconnected, as sea water between the members cannot escape from the sealed cavity between the members, or, when the members are disconnected, a vacuum is formed therebetween.

Ideally, hydraulic couplings should, as far as possible, be pressure balanced, so that fluid pressure does not hinder connection or urge separation of the male and female members. Preferably, to prevent loss of fluid during coupling or uncoupling, the members should include valve means to open automatically on coupling and close automatically on uncoupling. Further, the coupling member should employ seals which can withstand high pressures as well as the corrosive effects of subsea environments. The present invention solves all of these needs and requirements.

SUMMARY OF THE INVENTION

The present invention resides in a probe member for a hydraulic coupling of the foregoing type, where the body member of the male member is configured to promote connection or disconnection of the coupling without hydraulic because of the sealed space between the members. The male member of the present invention allows sea water to bleed out between the members to balance the seals to sea pressure during connection or disconnection. In one embodiment, the body of the male member is provided with one or more concave depressions around its outer circumference. The concave depressions are axially spaced from each of the seals in the female member bore when the male member is fully inserted into the bore. When the male member is partially withdrawn from, or partially inserted into, the female member bore, the concave depressions disengage the corresponding seals and provide a space for bleeding sea water around the seals, through a gap between the male and female members. Thus, the concave depressions balance each seal to ambient pressure as the male is partially inserted, or partially removed from the female member bore.

Preferably, radially expanding metal seals are used to seal the annular space between the male and female members. Fluid pressure in the coupling urges the seals to expand radially to engage the receiving chamber wall and the circumference of the male member. The concave depressions are located axially in relation to each of the seals to simultaneously disengage each of the seals from the male member circumference as the members are disconnected.

DETAILED DESCRIPTION OF THE PREFERRED EMBODIMENT

Figure 1:
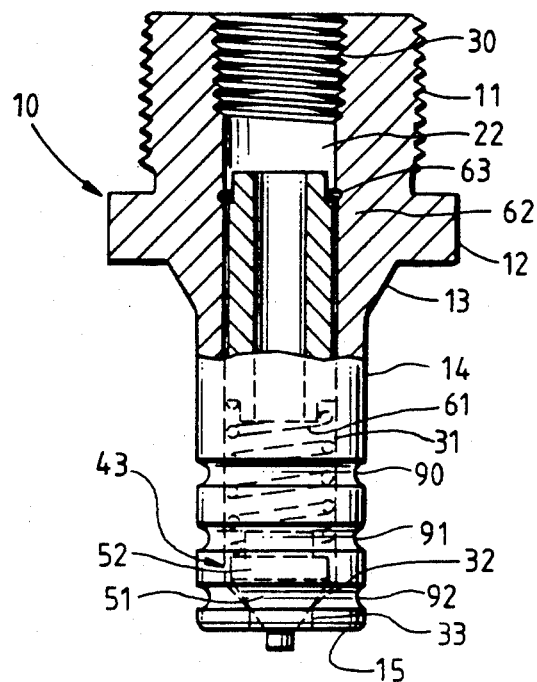
FIG. 1 is a section view of the male member or probe according to a first embodiment of the present invention.

Referring to FIG. 1, a preferred embodiment of the present invention comprises a male member 10, or probe, which has an externally threaded handle 11, a flange 12, a tapered shoulder 13, a cylindrical probe wall 14, and a probe face 15. The cylindrical probe wall 14 is adapted for sliding engagement with a receiving chamber or bore in a female coupling member, as will be discussed below.

Male member 10 also is provided with a central bore 22, which may have several variations in its diameter as it extends through the body of the male member 10. In a preferred embodiment, the first end of the central bore comprises an internally threaded section 30 adapted for connection to a hydraulic line. Adjacent the threaded section is a cylindrical passageway 31 extending longitudinally within the male member body and terminating at valve seat 32 which is an inclined shoulder. Adjacent the valve seat is cylindrical passage 33 having a reduced diameter.

In the embodiment shown in FIG. 1, a valve assembly 43 is slidably received within cylindrical passageway 31 in the male member. The various parts of the valve assembly include a conical valve face 51 dimensioned to seat against valve seat 32, and a hollow cylindrical body section 52 having an outer diameter somewhat less than the diameter of cylindrical passageway 31. A helical valve spring 61 abuts the hollow cylindrical body section 52 to urge the valve face 51 into a closed position against valve seat 32. The helical valve spring is located within the cylindrical passageway and anchored at hollow spring collar 62 which is held in place by collar clip 63 at the inner surface of the cylindrical passageway of male member 10. When conical valve face 51 is in a closed position against the valve seat, the valve assembly seals off hydraulic fluid from flowing through the male member.

Figure 2:
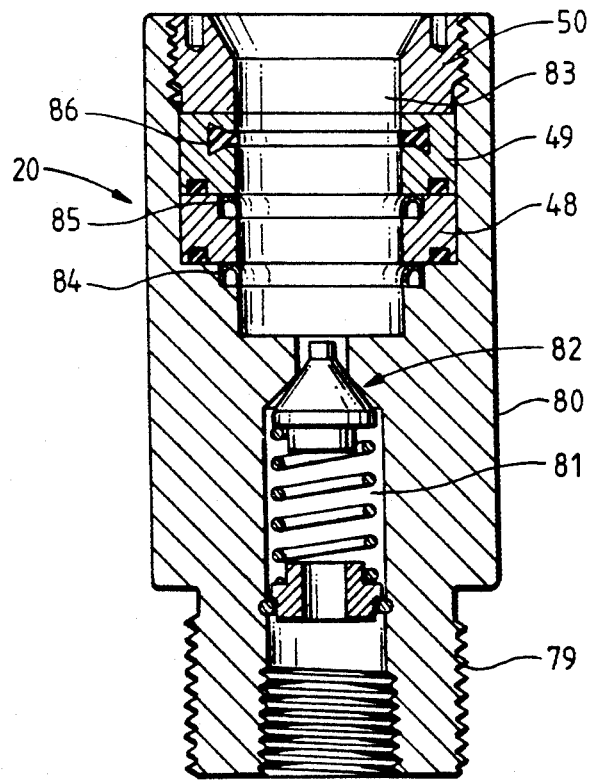
FIG. 2 is a section view of a female member that may be used with the male member of FIG. 1.

Shown in FIG. 2 is a female member 20 for use in accordance with the embodiment of the present invention of FIG. 1. The female member comprises an externally threaded handle 79, a body 80, a valve bore 81, a valve assembly 82, 15 and a receiving chamber 83. One or more radial seals 84, 85, 86 are positionable in the annular space between the male member and female member receiving chamber. The seals are held in place with seal retaining members 48, 49, 50. The receiving chamber may have several variations in its diameter, as it extends through the body of the female member. In a preferred embodiment of the present invention, the valve assembly 82 of the female member is substantially similar to the valve assembly 43 of the male member.

Preferably, the outer diameter of probe wall 14 is slightly smaller than the inner diameter of the seal retainers 48, 49, 50 located in the female member receiving chamber 83. One or more radial seals 84, 85, 86 may extend radially into the receiving chamber to engage the outer circumference of the probe wall as it is inserted therein. Additionally, one or more of the radial seals may be pressure energized by hydraulic fluid in the coupling to expand the inner circumference of the seal radially inwardly to sealingly engage the probe wall.

Probe wall 14 has one or more concave depressions 90, 91, 92 spaced apart around its outer circumference. Preferably, the concave depressions are 0.020 inches in depth from the male member body. For example, in one embodiment of the present invention, the radius of the male member probe wall is 0.645 inches, while the radius of the probe wall at each concave depression is 0.625 inches.

Figure 3:
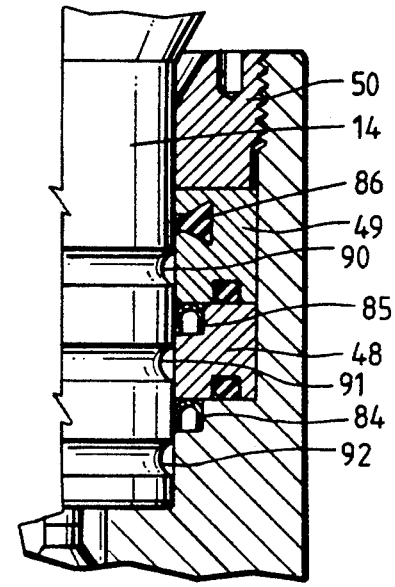
FIG. 3 is a section view of a portion of the male member fully inserted into the female member, according to the embodiment of FIG. 1.
Figure 4:
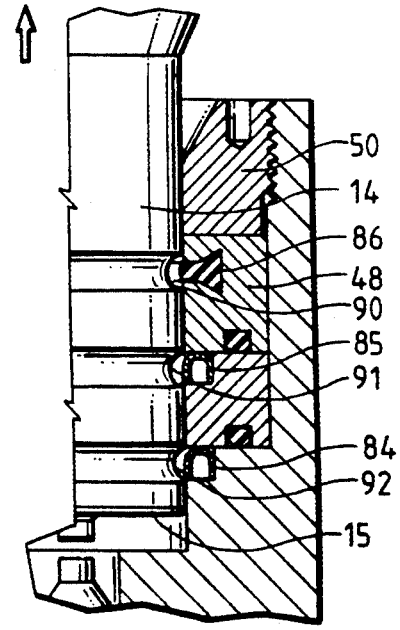
FIG. 4 is a section view of a portion of the male member partially withdrawn from the female member, according to the embodiment of FIG. 1.
Figure 1:
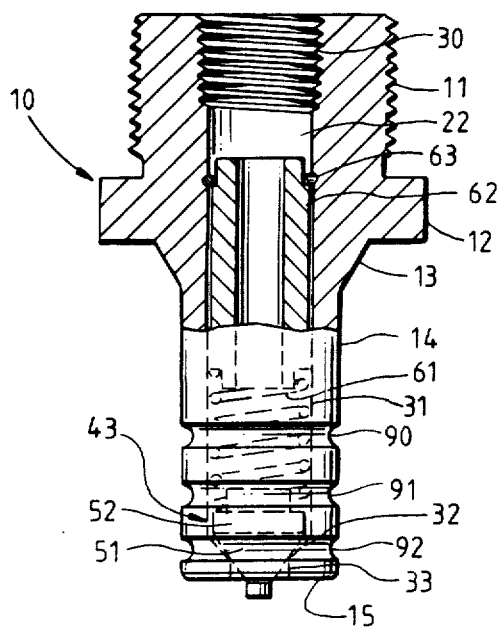
Figure 3:
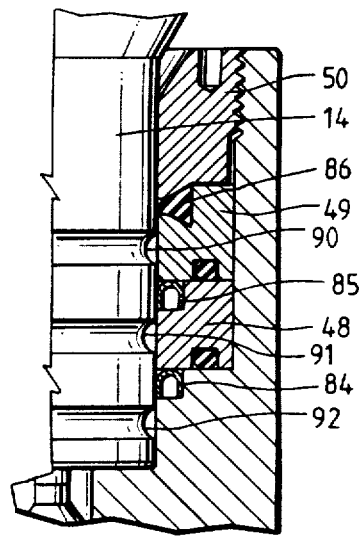
Figure 2:
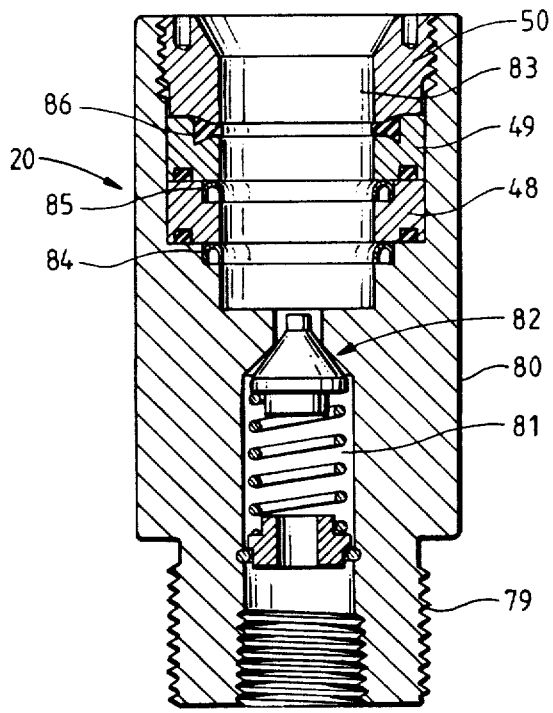
Figure 4:
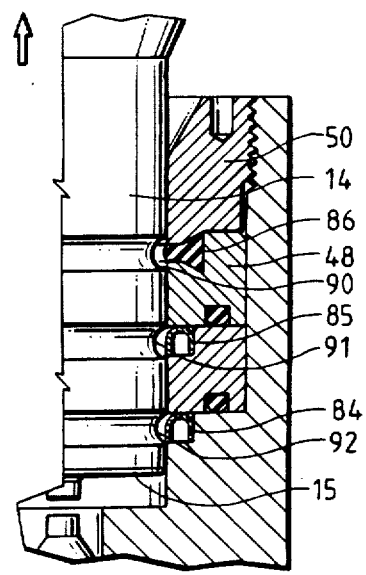

When the male member is inserted into the receiving chamber, concave depressions 90, 91, 92 move past the seals. When a concave depression is aligned with a seal, sea water escapes from the receiving chamber through the space created between the concave depression and seal. Thus, the radial seals, in various positions in the receiving chamber, disengage the probe wall when the concave depressions are aligned with the seals, as shown in FIG. 4. The concave depressions allow passage of sea water into or out from the the receiving chamber, to avoid any hydraulic lock between the male and female members. When the male member is fully inserted into the receiving chamber, as shown in FIG. 3, the seals are engaged with the probe wall, as the concave depressions are axially spaced from the seals.

In a preferred embodiment, radial seals 84, 85 are pressure-energized hollow metal seals. These seals are retained in the annulus between the male and female members by an inner retainer 48 and an intermediate retainer 49. Retainers 48, 49 may be held in place with a clip or an outer retainer 50 that is threaded to the female member receiving chamber. Optionally, a backup seal 86, which preferably is an elastomeric seal with a dovetail shape, may be used between the intermediate retainer 49 and the outer retainer 50.

Figure 5:
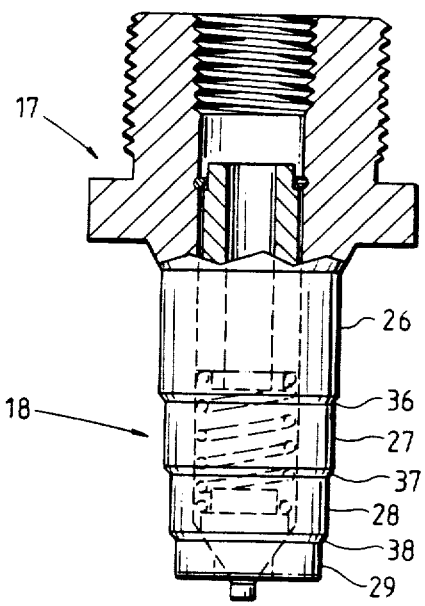
FIG. 5 is a section view of the male member or probe according to a second embodiment of the present invention.
Figure 6:
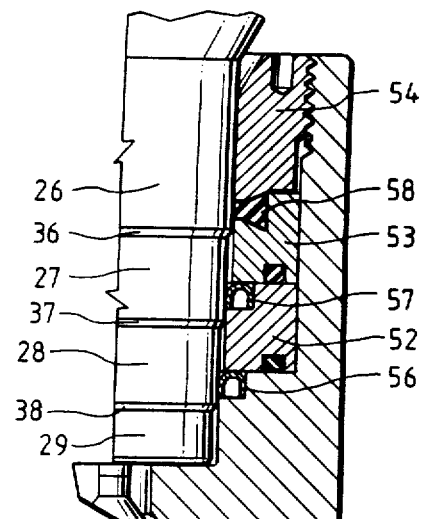
FIG. 6 is a section view of a portion of the male member fully inserted into a female member, according to the embodiment of FIG. 5.
Figure 7:
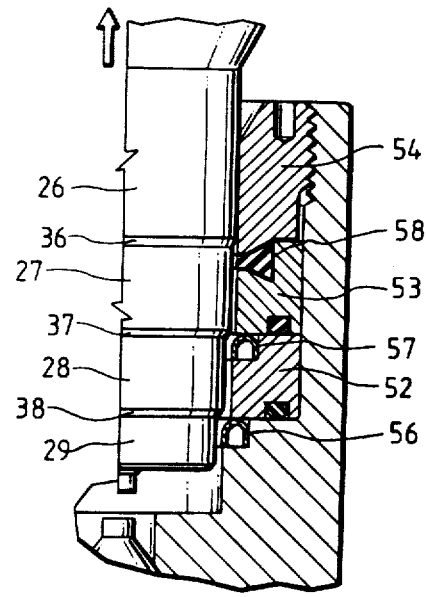
FIG. 7 is a section view of a portion of the male member partially withdrawn from the female member, according to the embodiment of FIG. 5.

A second embodiment of the present invention shown in FIGS. 5-7 includes a male member 17 having a probe wall 18 with a stepped outer circumference. The stepped outer circumference has two or more, and preferably four separate diameters 26, 27, 28, 29 with outer shoulders 36, 37, 38 between each diameter. The stepped outer circumference allows passage of sea water into or out from the receiving chamber during insertion or withdrawal of the male member from the receiving chamber of the female member. Further, the stepped body may have one or more concave depressions therein.

A female member for use with the second embodiment includes radial seals 56, 57, 58 and seal retainers 52, 53, 54. Preferably, radial seals 56, 57 are hollow, pressure energized metal seals, and radial seal 58 is an elastomeric seal having a dovetail interfit between retainers 53 and 54.

The retainers and seals of the second embodiment of the invention are dimensioned to sealingly engage the probe wall when the male member is fully inserted into the receiving chamber, as shown in FIG. 6. During insertion or withdrawal of the male member from the receiving chamber, each of the seals is disengaged to allow sea water to bleed past the seals to or from the receiving chamber, as shown in FIG. 7.

Although variations in the embodiment of the present invention may not each realize all the inventions of the invention, certain features may become more important than others in various applications of the device. The invention, accordingly, should be understood to be limited only by the scope of the appended claims.

What is claimed is:

1. A probe member for sliding insertion into a receiving member in an undersea hydraulic coupling, the probe member having an outer circumferential surface and the receiving member having at least one radial seal for sealing engagement with the outer circumferential surface of the probe member, comprising: at lease one concave depression in the outer circumferential surface of the probe member and spaced axially from said at least one radial seal when the probe member is fully inserted into the receiving chamber such that the radial seal is in sealing engagement with the outer circumferential surface, said at least one concave depression having sufficient depth to sealingly disengage the radial seal from the outer circumferential surface when the radial seal is aligned axially with the concave depression during partial withdrawal of the probe member from the receiving member.

2. The probe member of claim 1 further comprising at least one normally closed valve means to control the flow of hydraulic fluid between the probe member and the receiving member.

3. The probe member of claim 2 wherein the at least one normally closed valve means is closed when the radial seal is aligned axially with the concave depression during partial withdrawal of the probe member from the receiving member.

4. The probe member of claim 1 wherein the outer circumferential surface of the probe member is stepped.

5. The probe member of claim 1 wherein the radial seal is a pressure-energized metal seal having an internal cavity therein.

6. The probe member of claim 5 further comprising a retainer holding the pressure-energized metal seal in place when the probe member is withdrawn fully or partially from the receiving chamber.

7. An undersea hydraulic coupling, comprising:
   (a) a female member having a receiving chamber with at least one pressure-energized radial seal insertable into the receiving chamber and having an inner circumference and outer circumference, and a seal retaining member having an internal bore and engageable with the receiving chamber adjacent the seal for retaining the seal in place and axially compressing the seal whereby the inner circumference of the seal protrudes radially inwardly into the internal bore of the seal retaining member; and
   (b) a male member insertable into the receiving chamber, the male member having a cylindrical body with a circumferential groove, the cylindrical body of the male member engaging the inner circumference of the seal when the male member is inserted through said seal retaining member into the receiving chamber, the cylindrical body disengaging the seal when said at least one circumferential groove is axially aligned with the seal.

8. The undersea hydraulic coupling of claim 7 wherein the cylindrical body of the male member has a plurality of circumferential grooves.

9. The undersea hydraulic coupling of claim 7 wherein the pressure-energized radial seal is a C-shaped metal seal.

10. The undersea hydraulic coupling of claim 7 further comprising a valve in each of the male member and female member, the valves being positioned to exert opposing forces to urge the valves open when the male member is inserted into the receiving chamber.

11. The undersea hydraulic coupling of claim 7 wherein the cylindrical body of the male member comprises at least two separate concentric surfaces with a step between each surface.

12. A probe member for insertion into a mating member in an undersea hydraulic coupling, comprising:
   (a) a body having a longitudinal bore extending therethrough from a first end to a second end thereof, the bore having a valve seat adjacent the first end;
   (b) a valve configured to slide within said bore, the valve including bias means to urge the valve into a normally closed position against the valve seat; and
   (c) a probe wall having a stepped cylindrical shape with progressively larger diameters from the first end to the second end of the body.

13. The probe member of claim 12 further comprising at least one circumferential depression in the probe wall, and wherein the mating member is provided with a radial seal for sealing engagement with the probe wall of the male member, the circumferential depression causing disengagement of the radial seal from the probe wall during withdrawal or insertion of the probe member into the mating member.

14. A probe member for insertion into a receiving member of a hydraulic coupling, the receiving member having a radial metal seal, comprising:
   (a) a cylindrical body having a longitudinal bore extending therethrough from a first end to a second end thereof, the bore having a valve seat adjacent the first end, the cylindrical body engaging the radial metal seal for sealing engagement with the receiving member, the cylindrical body being provided with at least one circumferential depression for disengaging the radial metal seal from the cylindrical body during insertion or withdrawal of the probe member from the receiving member; and
   (b) a slidable valve in the longitudinal bore and spring means urging the valve towards a closed position against the valve seat, the valve being in the closed position when the circumferential depression disengages the radial metal seal from the cylindrical body.

15. The probe member of claim 14 wherein the cylindrical body is provided with at least two progressively larger diameters beginning at the first end thereof, and an outer shoulder between each diameter.

16. The probe member of claim 14 wherein the cylindrical body is provided with two circumferential depressions for simultaneously disengaging two radial metal seals from the cylindrical body during insertion or withdrawal of the probe member from the receiving member.

17. The probe member of claim 14 wherein the cylindrical body is provided with three circumferential depressions for simultaneously disengaging three radial seals, at least two of the seals being radial metal seals, during insertion or withdrawal of the probe member from the receiving member.

* * * * *

UNITED STATES PATENT AND TRADEMARK OFFICE
CERTIFICATE OF CORRECTION

PATENT NO.   : 5,232,021
DATED        : August 3, 1993
INVENTOR(S)  : Robert E. Smith, III It is certified that error appears in the above-indentified patent and that said Letters Patent is hereby corrected as shown below:

The drawing sheets, consisting of Figs. 2-4 and 6-7, should be deleted to be replaced with the drawing sheets, consisting of Figs. 2-4 and 6-7, as shown on the attached pages.

Signed and Sealed this

Twenty-second Day of March, 1994

Attest:

BRUCE LEHMAN

Attesting Officer

Commissioner of Patents and Trademarks

Patent No: 5,232,021